United States Patent
Asai et al.

[11] Patent Number: 5,943,221
[45] Date of Patent: Aug. 24, 1999

[54] PORTABLE POWER UNIT

[75] Inventors: Kouichi Asai, Wako; Motohiro Shimizu, Kawagoe, both of Japan

[73] Assignee: Honda Giken Kogyo Kabushiki Kaisha, Tokyo, Japan

[21] Appl. No.: 09/159,865

[22] Filed: Sep. 24, 1998

[30] Foreign Application Priority Data

Jun. 10, 1997 [JP] Japan .................................. 9-289176

[51] Int. Cl.⁶ .................................................. H02M 7/521
[52] U.S. Cl. .............................................. 363/10; 363/136
[58] Field of Search .................................. 363/9, 10, 39, 363/40, 96, 98, 132, 135, 136, 149, 160

[56] References Cited

U.S. PATENT DOCUMENTS

| | | | |
|---|---|---|---|
| 4,574,340 | 3/1986 | Baker | 363/41 |
| 4,992,920 | 2/1991 | Davis | 363/36 |
| 5,426,578 | 6/1995 | Nakamura et al. | 363/37 |
| 5,717,293 | 2/1998 | Sellers | 315/111.21 |

FOREIGN PATENT DOCUMENTS

| | | |
|---|---|---|
| 4-355672 | 12/1992 | Japan . |
| 7-67229 | 7/1995 | Japan . |
| 10-52046 | 2/1998 | Japan . |

*Primary Examiner*—Matthew Nguyen
*Attorney, Agent, or Firm*—Frishauf, Holtz, Goodman, Langer & Chick, P.C.

[57] ABSTRACT

A portable power unit is provided. A desired waveform signal indicative of a desired waveform having a desired frequency is generated. Switching control of a variable control bridge circuit is performed based on the desired waveform signal to cause the variable control bridge circuit to generate an alternating current output. A waveform of the alternating current output is detected to generate an output waveform signal indicative of the detected waveform of the alternating current output. A power factor is detected by comparing the desired waveform signal and the output waveform signal to generate a power factor signal indicative of the detected power factor. Voltage of the alternating current output is controlled based on the power factor signal.

14 Claims, 11 Drawing Sheets

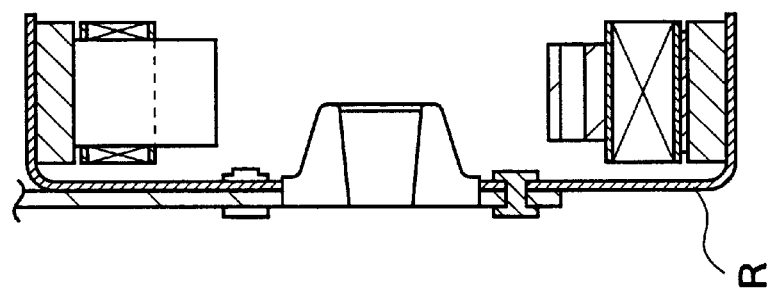
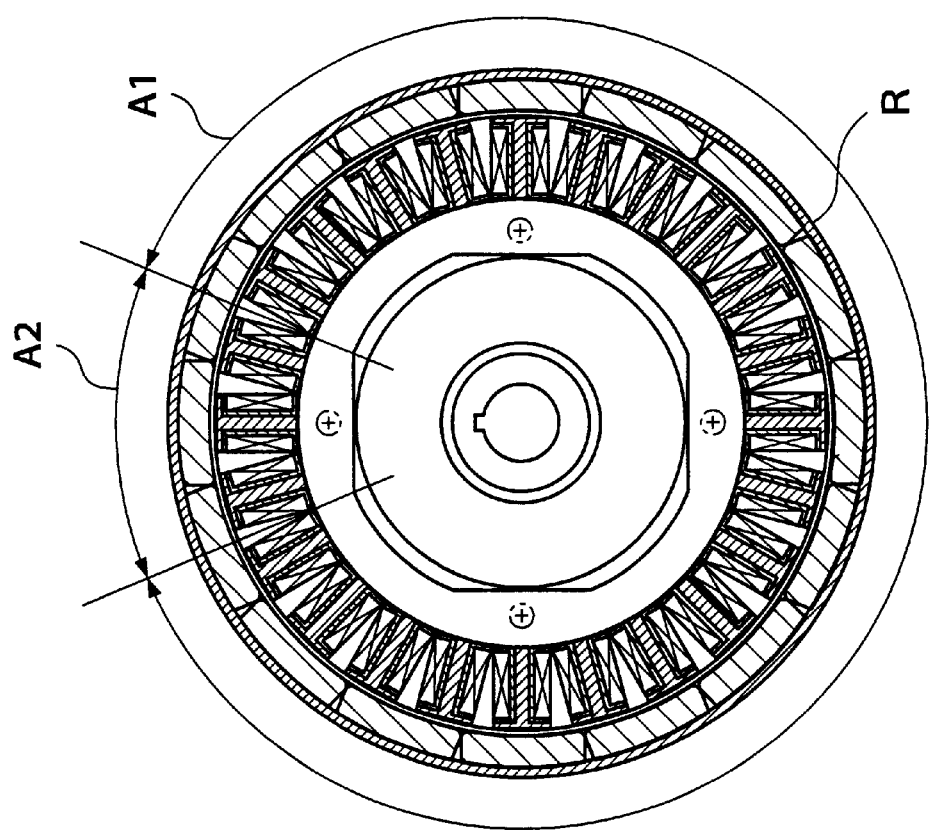

α=60°

α=60°

α=120°

α=120°

PORTABLE POWER UNIT

BACKGROUND OF THE INVENTION

1. Field of the Invention

This invention relates to a portable power unit which generates a single-phase AC power having a commercial frequency or a like frequency.

2. Prior Art

Conventionally, a portable power unit which is a combination of a small-sized engine and a synchronous generator, for instance, is widely used for emergency purposes, outdoor works, leisure time amusement, etc.

In this type of conventional portable power unit, however, the output frequency depends on the rotational speed of the engine. Therefore, in the case of a bipolar generator, to obtain an AC output of 50 Hz (or 60 Hz), the rotational speed of the engine is required to be held at 3000 rpm (or 3600 rpm), i.e. a relatively low rotational speed, which degrades the operating efficiency of the power unit, and further, necessitates designing the generator to be large in size, resulting in an increased total weight of the power unit.

To overcome this inconvenience, a so-called inverter generator has been proposed by the present assignee, e.g. in Japanese Patent Publication (Kokoku) No. 7-67229 and Japanese Laid-Open Patent Publication (Kokai) No. 4-355672, in which the engine is operated at a relatively high rotational speed to obtain a high AC power from the generator, the AC power is once converted to direct current, and then the direct current is converted to alternating current having a commercial frequency by an inverter.

The conventional inverter generator, however, requires provision of two power conversion blocks, i.e. an AC-to-DC conversion block for once converting the AC power to DC power, and a DC-to-AC conversion block for converting the DC power to AC power having a predetermined frequency, as well as a circuit for temporarily storing the DC power. Thus, the use of a lot of expensive power circuit components is necessitated. This makes it difficult to reduce the size of the generator and leads to an increased manufacturing cost.

As a solution to this problem, the present assignee has further proposed in Japanese Laid-Open Patent Publication (Kokai) No. 10-52046 a portable power unit in which a cycloconverter is employed for use with the generator instead of an inverter, to directly convert a high-frequency AC power generated by the generator to AC power having a predetermined frequency such as a commercial frequency.

However, there still remains a problem as described below even after the inverter is replaced by the cycloconverter.

That is, energy stored in the load returns to the power unit under a low power factor load condition. When the cycloconverter is employed for use with the generator, however, this energy is directly regenerated at the main coil of the generator, so that the cycloconverter is brought into an uncontrollable state due to inability of self-arc extinction when an electric current exceeding the capacity of the generator returns to the input of the cycloconverter, i.e. when an electric current returns at a higher voltage than the voltage of generated electric current.

SUMMARY OF THE INVENTION

It is an object of the invention to provide a portable power unit which is capable of maintaining stable operation even under a low power factor load condition.

To attain the above object, according to a first aspect of the invention, there is provided a portable power unit comprising:

variable control bridge circuit means; desired waveform signal-generating means for generating a desired waveform signal indicative of a desired waveform having a desired frequency;

switching control means for performing switching control of the variable control bridge circuit means, based on the desired waveform signal to cause the variable control bridge circuit means to generate an alternating current output;

output waveform-detecting means for detecting a waveform of the alternating current output to generate an output waveform signal indicative of the detected waveform of the alternating current output;

power factor-detecting means for detecting a power factor by comparing the desired waveform signal and the output waveform signal to generate a power factor signal indicative of the detected power factor; and output voltage control means for controlling voltage of the alternating current output based on the power factor signal.

Preferably, the power factor-detecting means includes waveform difference signal-generating means for detecting a difference between the desired waveform signal and the output waveform signal to generate a waveform difference signal indicative of the difference, and power factor signal-generating means for reducing the waveform difference signal to zero when the waveform difference signal and the desired waveform signal have opposite signs, and for outputting an absolute value of the waveform difference signal when the waveform difference signal and the desired waveform signal have an identical sign to thereby generate the power factor signal.

Preferably, the portable power unit includes correcting means for correcting the desired waveform signal with respect to a phase lag occurring within the portable power unit to generate a corrected desired waveform signal, and the power factor-detecting means detects the power factor by comparing the corrected desired waveform signal and the output waveform signal.

To attain the above object, according to a second aspect of the invention, there is provided a portable power unit comprising:

a magneto generator having three-phase output windings;

a pair of variable control bridge circuits connected to the three-phase output windings and connected in antiparallel connection to each other to form a cycloconverter for generating a single-phase alternating current to be supplied to a load, the single-phase alternating current having a desired frequency;

a bridge drive circuit responsive to a drive signal, for causing the pair of variable control bridge circuits to be alternately switched to operate every half a repetition period of the single-phase alternating current, to thereby cause the cycloconverter to generate the single-phase alternating current;

desired waveform signal-generating means for generating a desired waveform signal indicative of a desired waveform for controlling the drive signal;

output waveform-detecting means for detecting a waveform of the single-phase alternating current to generate an output waveform signal indicative of the detected waveform of the single-phase alternating current;

power factor-detecting means for detecting a power factor by comparing the desired waveform signal and the output waveform signal to generate a power factor signal indicative of the detected power factor; and output voltage control means for controlling voltage of the single-phase alternating current, based on the power factor signal.

Preferably, the output voltage control means includes comparison means for comparing the power factor with a predetermined value, and an output voltage control circuit for lowering the voltage of the single-phase alternating current when the power factor is lower than the predetermined value.

More preferably, the power factor-detecting means includes waveform difference signal-generating means for detecting a difference between the desired waveform signal and the output waveform signal to generate a waveform difference signal indicative of the difference, and power factor signal-generating means for reducing the waveform difference signal to zero when the waveform difference signal and the desired waveform signal have opposite signs, and for outputting an absolute value of the waveform difference signal when the waveform difference signal and the desired waveform signal have an identical sign to thereby generate the power factor signal.

More preferably, the portable power unit includes correcting means for correcting the desired waveform signal with respect to a phase lag occurring within the portable power unit to generate a corrected desired waveform signal, and wherein the power factor-detecting means detects the power factor by comparing the corrected desired waveform signal and the output waveform signal.

Preferably, the portable power unit includes a synchronizing signal-forming circuit for forming a synchronizing signal in synchronism with an output frequency of the magneto generator, and the drive signal is controlled based on both the desired waveform signal and the synchronizing signal.

More preferably, the portable power unit includes an output voltage-detecting circuit for detecting the voltage of the single-phase alternating current, and an output voltage-adjusting circuit for comparing the voltage detected by the output voltage-detecting circuit with a desired voltage to thereby control the bridge drive circuit in a manner such that the voltage of the single-phase alternating current is maintained substantially at a fixed value.

More preferably, the magneto generator has a magnet rotor, a stator having a plurality of magnet poles, the magnet poles being formed by ones around which the three-phase output windings are wound, and other magnet poles, and signal windings wound around the other magnet poles, the synchronizing signal being taken out from the signal windings wound around the other magnet poles.

Further preferably, the magneto generator is driven by an internal combustion engine having a flywheel, the magnet rotor also serving as the flywheel of the engine.

The above and other objects, features and advantages of the invention will become more apparent from the following detailed description taken in conjunction of the accompanying drawings.

BRIEF DESCRIPTION OF THE DRAWINGS

FIG. 2A is a transverse cross-sectional view of an AC generator appearing in FIG. 1;

FIG. 2B is a longitudinal cross-sectional view of the AC generator;

DETAILED DESCRIPTION

Next, the invention will be described with reference to drawings showing an embodiment thereof.

Figure 1:
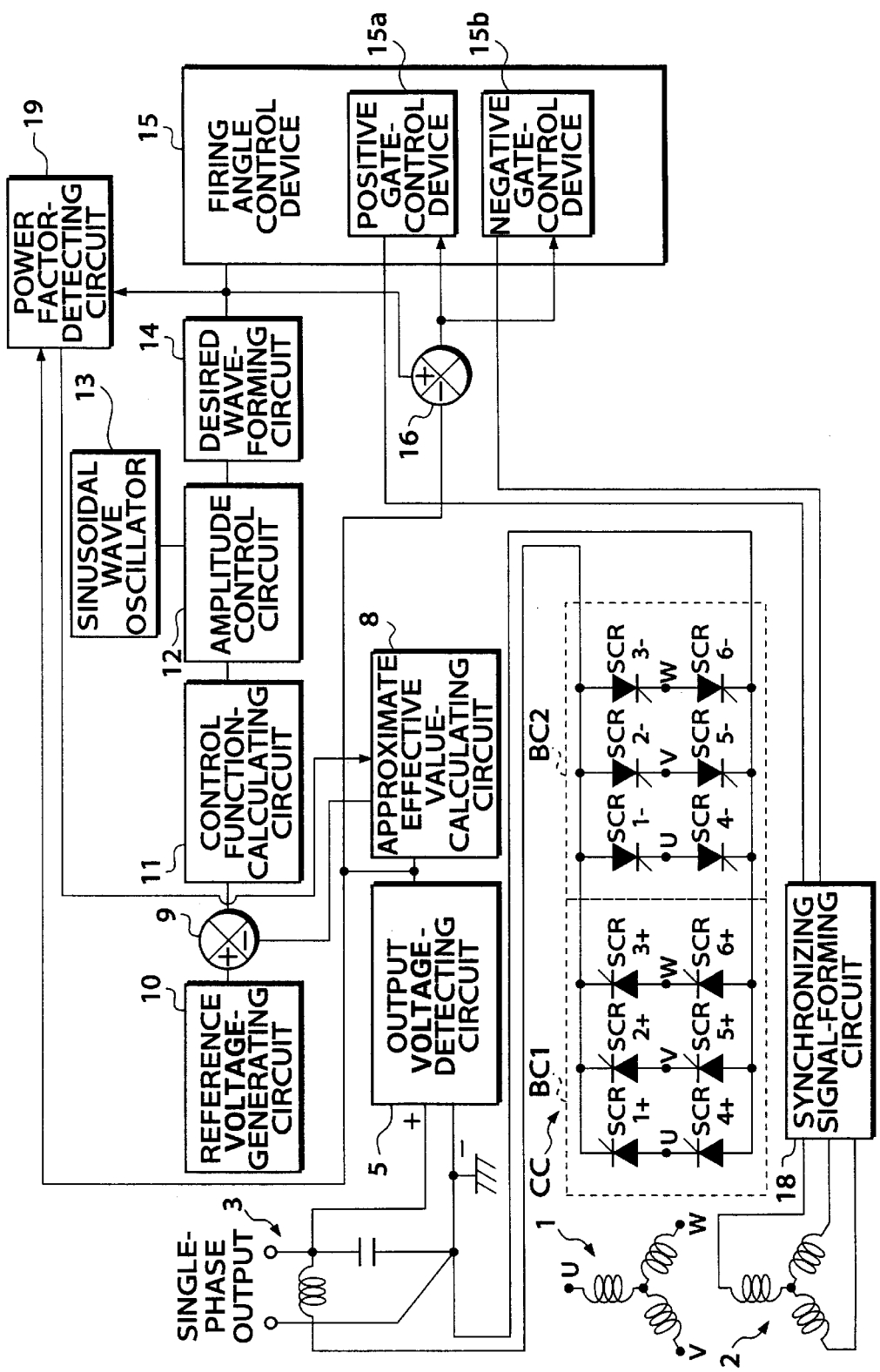
FIG. 1 is a block diagram schematically showing embodiment of the invention.

FIG. 1 shows the whole arrangement of a portable power unit according to an embodiment of the invention.

In the figure, reference numerals 1 and 2 designate output windings independently wound around a stator of an AC generator, i.e. reference numeral 1 designates a three-phase main output winding (hereinafter referred to as the "three-phase main coil"), and reference numeral 2 designates a three-phase auxiliary output winding (hereinafter referred to as the "three-phase sub coil"), respectively.

FIGS. 2A and 2B show the construction of the AC generator in longitudinal cross-section and transverse cross-section, respectively. The three-phase main coil 1 is formed of coils forming 21 poles within an area A1, and the three-phase sub coil 2 is formed of coils forming three poles within an area A2. A rotor R is formed with eight pairs of magnetic poles of permanent magnets, and driven for rotation by an internal combustion engine, not shown. The rotor R also serves as a flywheel of the engine.

Referring again to FIG. 1, the three-phase main coil 1 has three output terminals U, V, and W which are connected respectively to input terminals U, V and W of a cycloconverter CC.

Figure 3:
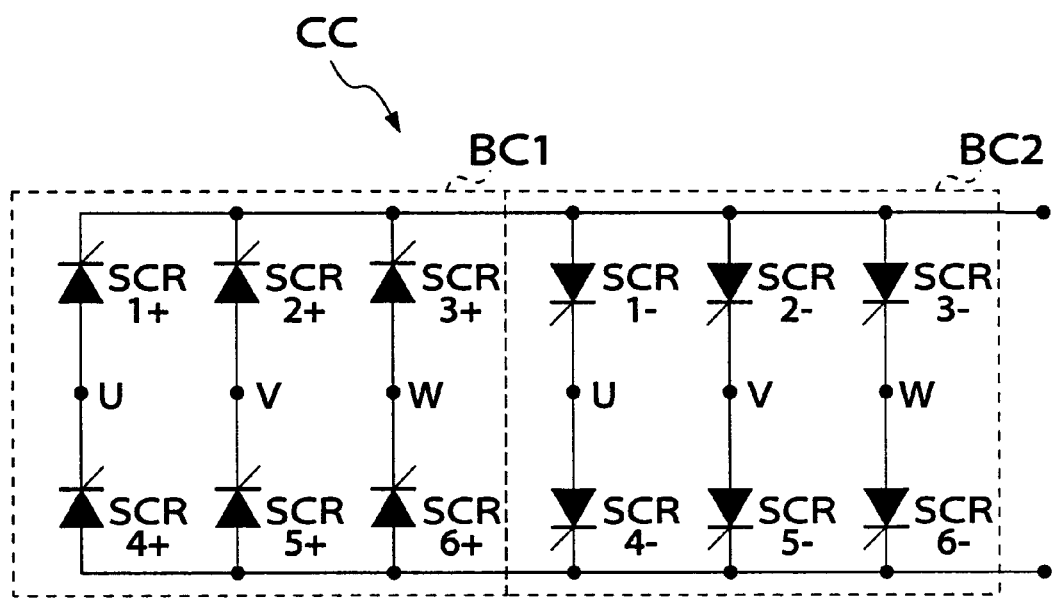
FIG. 3 is a circuit diagram of a cycloconverter appearing in FIG. 1.

FIG. 3 shows the construction of the cycloconverter CC appearing in FIG. 1. As shown in the figure, the cycloconverter CC is comprised of twelve thyristors SCRk± (k=1, 2, ..., 6), with six thyristors SCRk+ thereof forming a bridge circuit (hereinafter referred to as "the positive converter") BC1 for delivering positive electric current, and the remaining six thyristors SCRk– thereof forming another bridge circuit (hereinafter referred to as "the negative converter") BC2 for delivering negative electric current.

When the three-phase generator with 24 poles (three of them are used to generate synchronizing signals for control of respective gates of the thyristors SCRK±) connected to the cycloconverter CC is driven by the engine, eight cycles of three-phase alternating current are supplied to the cycloconverter CC per one revolution of the crankshaft of the engine. If the rotational speed of the engine is set to a range of 1200 rpm to 4500 rpm (equivalent to a frequency range of 20 Hz to 75 Hz), the frequency of the three-phase AC output from the generator is 160 Hz to 600 Hz, eight times as high as the rotational speed of the engine.

Referring again to FIG. 1, the three output terminals U, V, and W of the three-phase main coil 1 are connected to the respective input terminals U, V and W of each of the positive and negative converters BC1 and BC2 of the cycloconverter CC. The output side of the cycloconverter CC is connected to an LC filter 3 for removing harmonic components of output current from the cycloconverter CC. The output side of the LC filter 3 is connected to an output voltage-detecting circuit 5 for detecting a voltage of the output current with the harmonic components removed, delivered from the LC filter 3. The output voltage-detecting circuit 5 has a positive input terminal thereof connected to negativeilter 3 and a negative input terminal thereof connected to a ground GND of the control system of the power unit whereby a single-phase output is obtained from the positive and negative input terminals of the output voltage-detecting circuit 5.

The output voltage-detecting circuit 5 has an output side thereof connected to an approximate effective value-calculating circuit 8 for calculating an approximate effective value of the output voltage from the circuit 5. The circuit 8 has an output side thereof connected to a negative input terminal of a comparator 9. Connected to a positive input terminal of the comparator 9 is a reference voltage-generating circuit 10 for generating a reference output voltage value for the power unit. The comparator 9 has an output side thereof connected to a control function-calculating circuit 11 which calculates a control function, such as a linear function, based on results of the comparison by the comparator 9.

The control function-calculating circuit 11 has an output side thereof connected to an amplitude control circuit 12 which controls the amplitude of a sinusoidal wave having a commercial frequency of 50 Hz or 60 Hz delivered from a sinusoidal wave oscillator 13 connected thereto. That is, the amplitude control circuit 12 delivers an amplitude control signal generated based on the amplitude of the sinusoidal wave delivered from the sinusoidal wave oscillator 13 in response to the control function delivered from the control function-calculating circuit 11.

The amplitude control circuit 12 has an output side thereof connected to a desired wave-forming circuit 14 which generates a desired wave in response to the amplitude control signal from the circuit 12. The desired wave-forming circuit 14 has an output side thereof connected to a firing angle control device 15 for controlling the firing angle of a gate of each of the thyristors SCRk± constituting the cycloconverter CC, as well as to a positive input terminal of a comparator 16.

Further, the output sides of the output voltage-detecting circuit 5 and the desired wave-forming circuit 14 are also connected to a power factor-detecting circuit 19 for detected a power factor based on results of a comparison between a detected wave of single-phase output AC current from the output voltage-detecting circuit 5 and the desired wave output from the desired wave-forming circuit 14. The power factor-detecting circuit 19 has an output side thereof connected to the approximate effective value-calculating circuit 8.

Figure 4A:
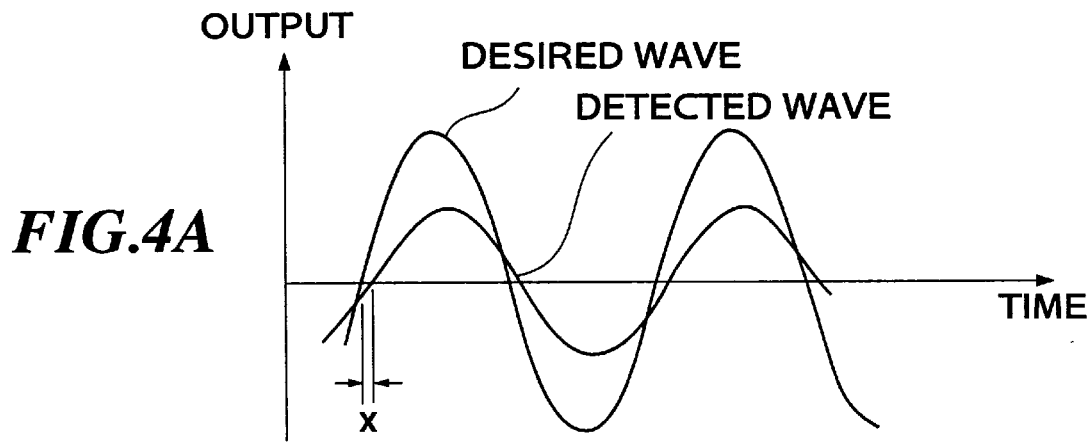
FIGS. 4A to 4C are diagrams showing detected waves of a single-phase alternating output from an output voltage-detecting circuit 5 appearing in FIG. 1, and desired waves delivered from a desired wave-forming circuit 14 appearing in FIG. 1, under different power factor and load conditions.
Figure 4B:
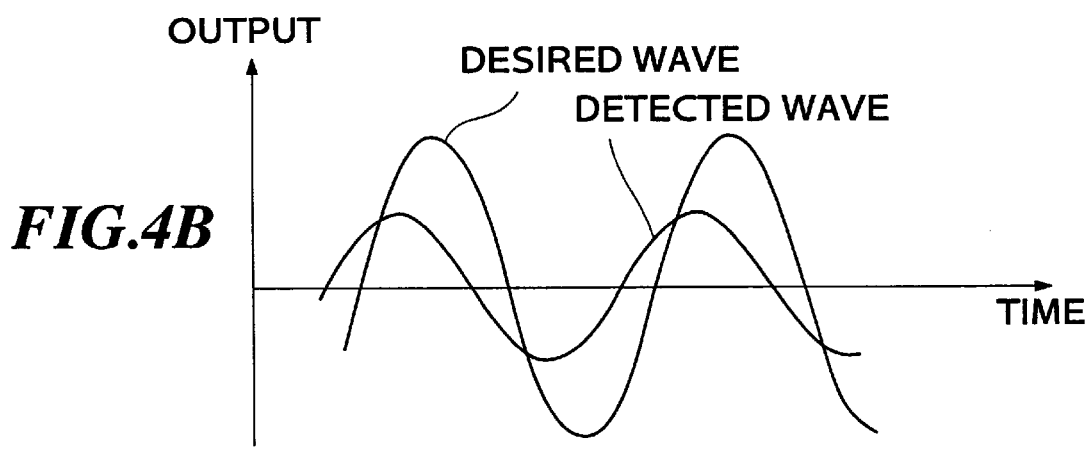
Figure 4C:
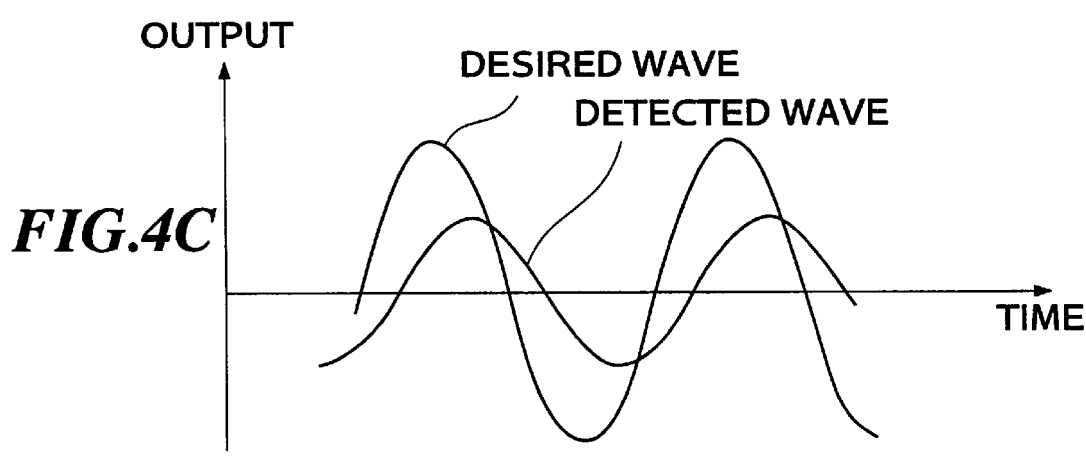

FIGS. 4A to 4c show the detected wave output from the output voltage-detecting circuit 5 and the desired wave output from the desired wave-forming circuit 14. FIG. 4A shows these waves obtained in a case where the power factor is equal to "1", FIG. 4B a case where the power factor is smaller than "1", and the load has a delayed phase, and FIG. 4C a case where the power factor is smaller than "1" and the load has an advanced phase.

As shown in FIG. 4A, when the power factor is equal to "1", the detected wave lags behind the desired wave by a fixed time "x" which is equivalent to a phase lag occurring within the power unit of the embodiment. When the power factor is smaller than "1" and the load has a delayed phase, the detected wave advances in phase with respect to the desired wave by an amount corresponding to the power factor minus the delay by the fixed time "x", whereas when the power factor is smaller than "1" and the load has an advanced phase, the detected wave has a phase lag with respect to the desired wave by an amount corresponding to the power factor plus the delay by the fixed time "x".

Figure 5A:
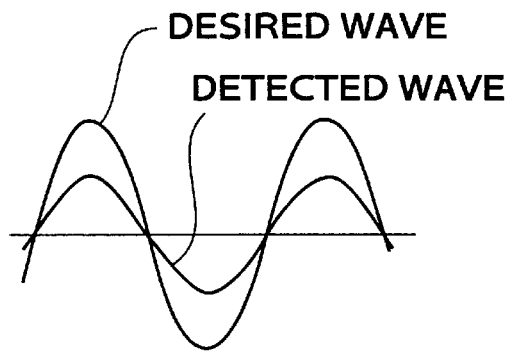
FIGS. 5A to 5H are diagrams which are useful in explaining a method of generating a signal indicative of the power factor, based on results of a comparison between the detection wave and the desired wave.
Figure 5B:
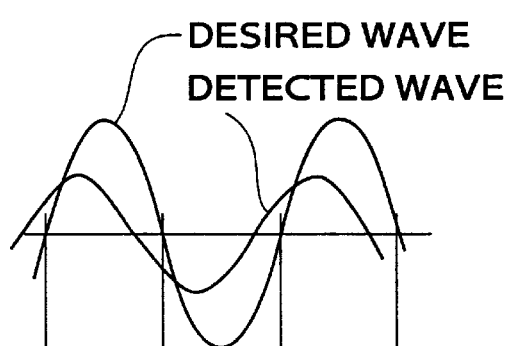

FIGS. 5A to 5H show diagrams which are useful in explaining a method of generating a signal indicative of the power factor detected based on results of the comparison between the detected wave and the desired wave. FIG. 5A shows the relationship between the detected wave and a desired wave represented in a state delayed by the fixed time "x" from the desired wave shown in FIG. 4A, while FIG. 5B shows the relationship between the detected wave and a desired wave represented in a state delayed by the fixed time "x" from the desired wave shown in FIG. 4B. The desired wave delayed by the fixed time "x" will be hereinafter referred to as "the desired wave 2".

Figure 5C:
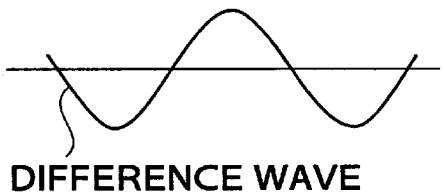
Figure 5D:
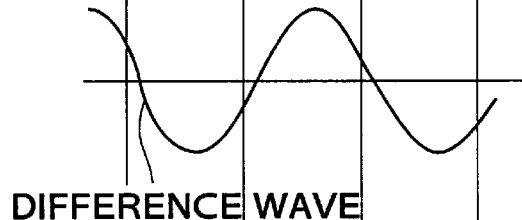

First, the output value indicative of the desired wave 2 from the desired wave-forming circuit 14 is subtracted from the output value indicative of the detected wave from the output voltage-detecting circuit 15 in each of FIGS. 5A and 5B, to obtain difference waves as shown in FIGS. 5C and 5B. Then, the output value of each difference wave and that of the desired wave 2 are compared with each other every moment. When the output value of the difference wave and that of the desired wave have the same sign, the output value of the difference wave is output (FIG. 5F), and then an absolute value of the adopted output value of the difference wave is adopted (FIG. 5H). Since the absolute value of the calculated output value of the difference wave contains noise which occurs within the power unit of the embodiment, an offset value equivalent to the noise is subtracted from the absolute value of the output value of the difference wave. When the subtraction result is a negative value, the negative value is replaced by "0". Then, areas representative of the absolute values of the difference wave are integrated over a predetermined time period. Further, a moving average of the integrated areas is calculated. Then, a value of power factor is determined according to the calculated moving average by the use of a table or the like. Thus, a signal indicative of the determined power factor can be obtained.

Figure 5E:
Figure 5F:
Figure 5G:
Figure 5H:

On the other hand, when the output value of the difference wave and that of the desired wave 2 have difference signs, the output value of the difference wave is set to "0" (FIG. 5E). In the case of FIG. 5A, however, the power factor is equal to "1" and hence the output value of the difference wave and that of the desired wave 2 always rane opposite signs, so that no signal indicative of the power factor is generated.

In the above described manner, the power factor-detecting circuit 19 generates the signal indicative of the power factor, and the approximate effective value of the output voltage from the output voltage-detecting circuit 5, which is calculated by the approximate effective value-calculating circuit 8, ua adjusted based on the generated signal. Under a low power factor load condition of the power unit, the approximate effective value calculated by the circuit 8 is adjusted to a lower value to lower the output voltage.

Referring again to FIG. 1, the firing angle control device 15 is comprised of a positive gate control device 15a for controlling the firing angles of gates of the thyristors SCRk+ of the positive converter BC1 (hereinafter referred to as "the positive gates"), and a negative gate control device 15b for controlling the firing angles of gates of the thyristors SCRk− of the negative converter BC2 (hereinafter referred to as "the negative gates").

The positive and negative gate control devices 15a, 15b each have six comparators, not shown, each of which compares the desired wave with a synchronizing signal (reference sawtooth wave), referred to hereinafter, and fires a corresponding gate when the two waves agree with each other The comparator 16 has a negative input terminal thereof connected to the output side of the output voltage-detecting circuit 5 and an output terminal thereof connected to the positive gate control device 15a and the negative gate control device 15b. The comparator 16 compares the output voltage from the output voltage-detecting circuit 5 with the desired wave, and selectively delivers a high (H) level signal and a low (L) level signal depending upon results of the comparison.

When the H level signal is delivered from the comparator 16, the positive gate control device 15a is enabled while the negative gate control device 15b is disabled. On the other hand, when the L level signal is delivered from the same, the positive gate control device 15a is disabled while the negative gate control device 15b is enabled.

The output side of the three-phase sub coil 2 is connected to a synchronizing signal-forming circuit 18.

Figure 6:
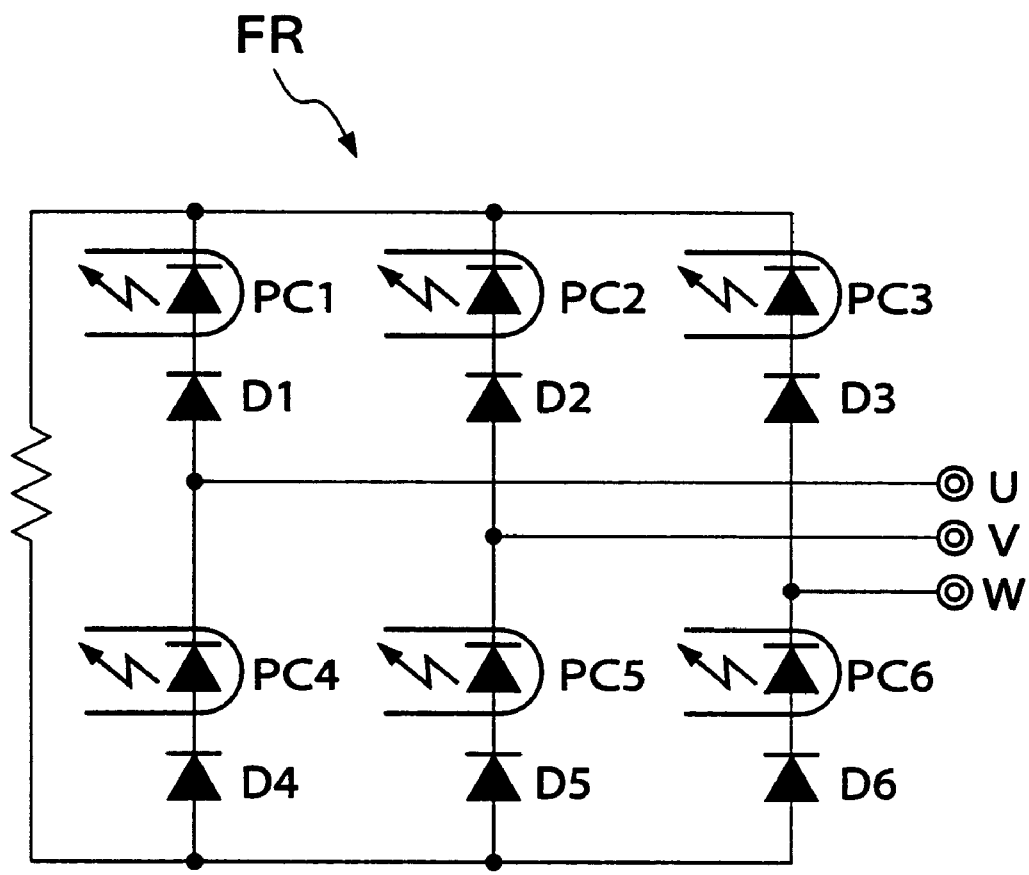
FIG. 6 is a circuit diagram showing the construction of a synchronizing signal-forming circuit 18 appearing in FIG. 1.

FIG. 6 shows the construction of the synchronizing signal-forming circuit 18. As shown in the figure, the circuit 18 is formed of six photocouplers PCk (k=1, 2, . . . , 6) and six diodes Dk (k=1, 2, . . . , 6).

Components of the three-phase alternating current (i.e. U-phase current, V-phase current, and W-phase current) obtained from the three-phase sub coil 2 are supplied to a three-phase full-wave bridge rectifier FR formed by primary light-emitting diodes (LED's) of the respective six photocouplers PCk and the six diodes Dk. Direct current components of the three-phase alternating current full-wave rectified by the three-phase full-wave rectifier FR are transformed into light by the primary light-emitting diodes, and then the light is converted into electric current by secondary photosensors, not shown, associated with the primary light-emitting diodes of the photocouplers PCk. In short, electric current corresponding to the three-phase alternating current full-wave rectified by the three-phase full-wave rectifier FR is delivered from the secondary photosensors of the photocouplers. The electric currents is used to form a synchronizing signal having e.g. a sawtooth waveform for controlling a phase control angle (firing angle) α of a gate of each of the thyristors SCRk±, as described in detail hereinafter.

Figure 7:
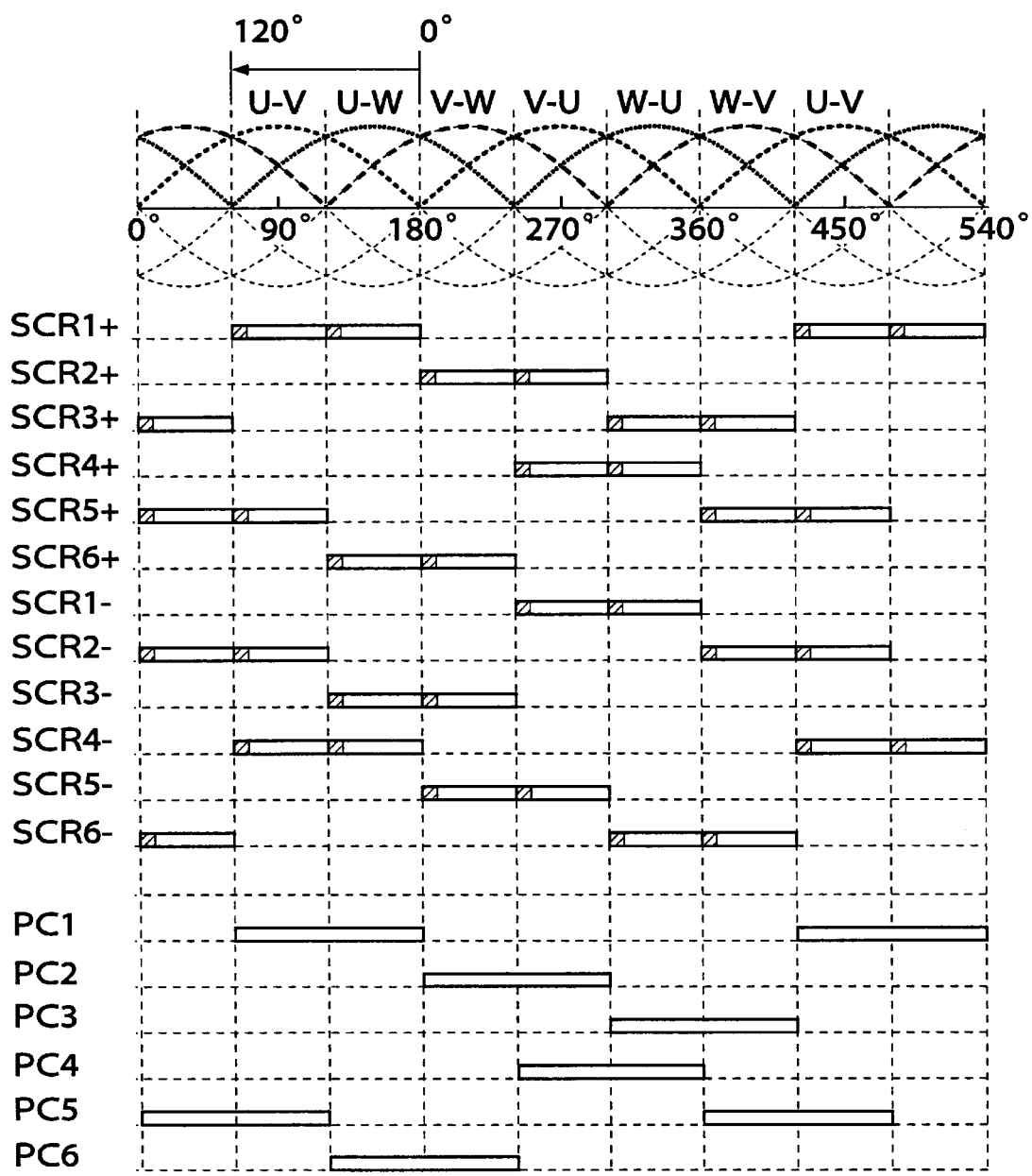
FIG. 7 is a timing chart showing changes in voltages applied between a U phase, a V phase, and a W phase, timing of turn-on of photocouplers, and timing of turn-on of gates of thyristors.

FIG. 7 shows changes in line-to-line voltages applied between respective pairs of the U, V, and W phases of the three-phase AC power and timing of "turn-on" of the photocouplers PCk.

Assuming that the line-to-line voltages (U-V, U-W, V-W, V-U, W-U, and W-V) change as shown in FIG. 7, the waveform of a full-wave rectified output from the three-phase full-wave rectifier FR has a repetition period of one sixth of that of the waveform of each line-to-line voltage obtained from the main coil. For example, when the U-V voltage is in a phase angle range of 60° to 120° where the U-V voltage is the highest of all the line-to-line voltages, the photocouplers PC1 and PC5 are turned on in pair (the other photocouplers are held off), whereby the three-phase full-wave rectifier circuit FR delivers electric current at a voltage corresponding to the U-V voltage. That is, the three-phase full-wave rectifier FR delivers electric current at a voltage corresponding to the maximum value of all the line-to-line voltages, so that the repetition period of the output voltage corresponds to a phase angle of 60°, and hence is equal to one sixth of the repetition period of the three-phase output voltage of the main coil, which corresponds to a phase angle of 360°.

FIG. 7 also shows a controllable range of timing of firing (turn-on) of the gate of each of the thyristors SCRk±, which is set to a phase angle range of 120° to 0° of a corresponding line-to-line voltage with two examples of timing of firing of each gate which are indicated by hatched portions (i.e. firing angles of 120° and 60°) described hereinafter.

According to this timing, each gate of the positive converter BC1 is fired (turned on) to deliver electric current therefrom, and each gate of the negative converter BC2 is turned on to absorb electric current thereto.

Needless to say, the gates are not required to be continuously held on over a selected portion of the controllable range, but the application of a predetermined pulse at timing indicated by the hatched portion (e.g. corresponding to one of the firing angles of 120° and 60°) enables the same operation as above to be performed.

FIGS. 8A to 8D show examples of waveforms of the output of the cycloconverter obtained when the thyristors SCRk± of the positive and negative converters BC1 and BC2 are fired at respective firing angles of 120° and 60°.

Figure 8C:
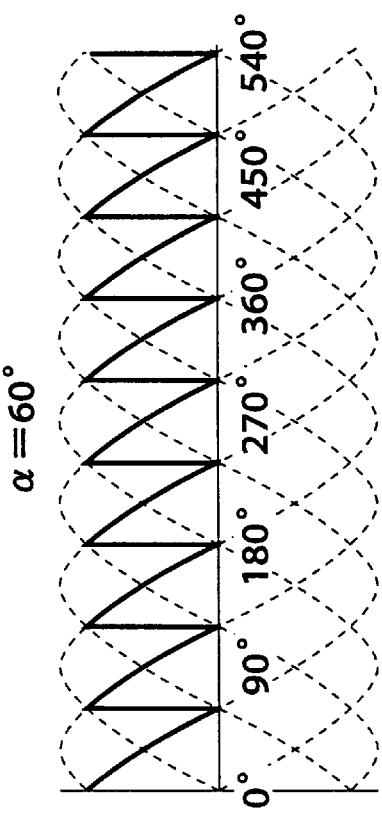
FIG. 8C is a diagram showing an output waveform of the positive converter exhibited when each thyristor thereof is fired at a firing angle of 60°.
Figure 8D:
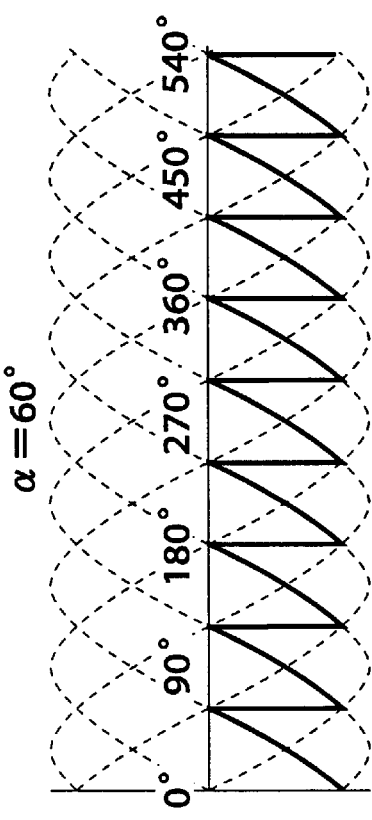
FIG. 8D is a diagram showing an output waveform of the negative converter exhibited when each thyristor thereof is fired at a firing angle of 60°.
Figure 8A:
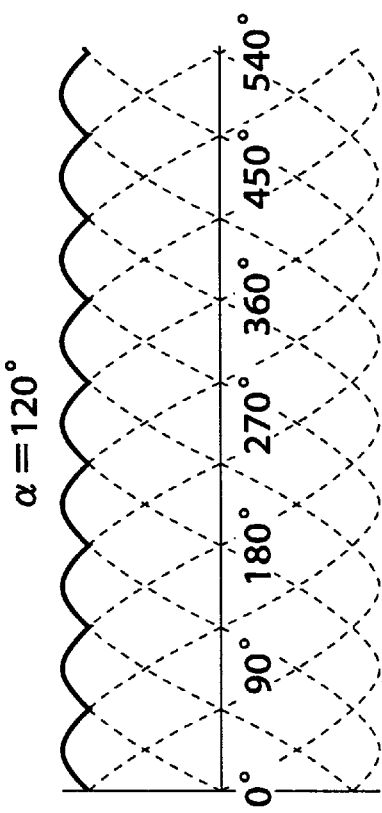
FIG. 8A is a diagram showing an output waveform of a positive converter exhibited when each thyristor thereof is filed at a firing angle of 120°.
Figure 8B:
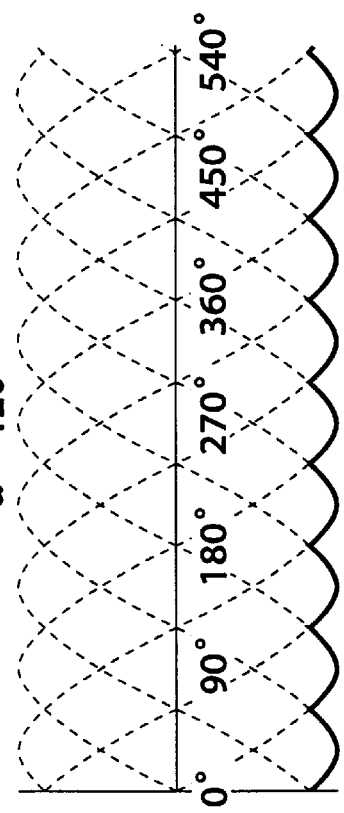
FIG. 8B is a diagram showing an output waveform of a negative converter exhibited when each thyristor thereof is fired at a firing angle of 120°.

FIG. 8A shows an output waveform of the cycloconverter CC obtained when each thyristor SCRk+ of the positive converter BC1 is turned on at a firing angle α of 120°, and FIG. 8B an output waveform of the same obtained when each thyristor SCRk− of the negative converter BC2 is turned on at a firing angle α of 120°. On the other hand, FIG. 8C shows an output waveform of the same obtained when each thyristor SCRk+ of the positive converter BC1 is turned on at a firing angle α of 60°, and FIG. 8D an output waveform of the cycloconverter CC obtained when each thyristor SCRk− of the negative converter BC2 is turned on at a firing angle α of 60°.

When each thyristor SCRk+ of the positive converter BC1 is turned on at the firing angle α of 120°, the output waveform of the cycloconverter CC presents a full-wave rectified current waveform as shown in FIG. 8A. When each thyristor SCRk+ of the positive converter BC1 is turned on at a firing angle α of 60°, the output waveform contains a lot of harmonic components as shown in FIG. 8C. These harmonic components, however, can be removed by a low-pass filter connected to the output side of the cycloconverter CC, so that electric current is output at an averaged voltage. As described hereinabove, assuming that the power supply to the cycloconverter is a three-phase generator having 24 poles, and the rotational speed of the engine is set to 3600 rpm, the frequency of a basic wave of the harmonic components is given by the following equation:

60 Hz (=3600 rpm) × 8(-th harmonic) × 3 (phases) ×

2 (half waves (=1 full wave)) = 2.88 kHz

Further, by varying the firing angle α of each thyristor of the positive converter BC1 within a range of 0° to 120°, the cycloconverter CC is capable of generating a positive voltage as desired which has an average voltage within a range of 0 V to a positive full-wave rectified voltage. By varying the firing angle α of each thyristor of the negative converter BC2 in the same manner, the cycloconverter CC is capable of generating a negative voltage as desired which has an average voltage within a range of 0 V to a negative full-wave rectified voltage.

Next, the manner of controlling the firing angle αwill be described.

Figure 9:
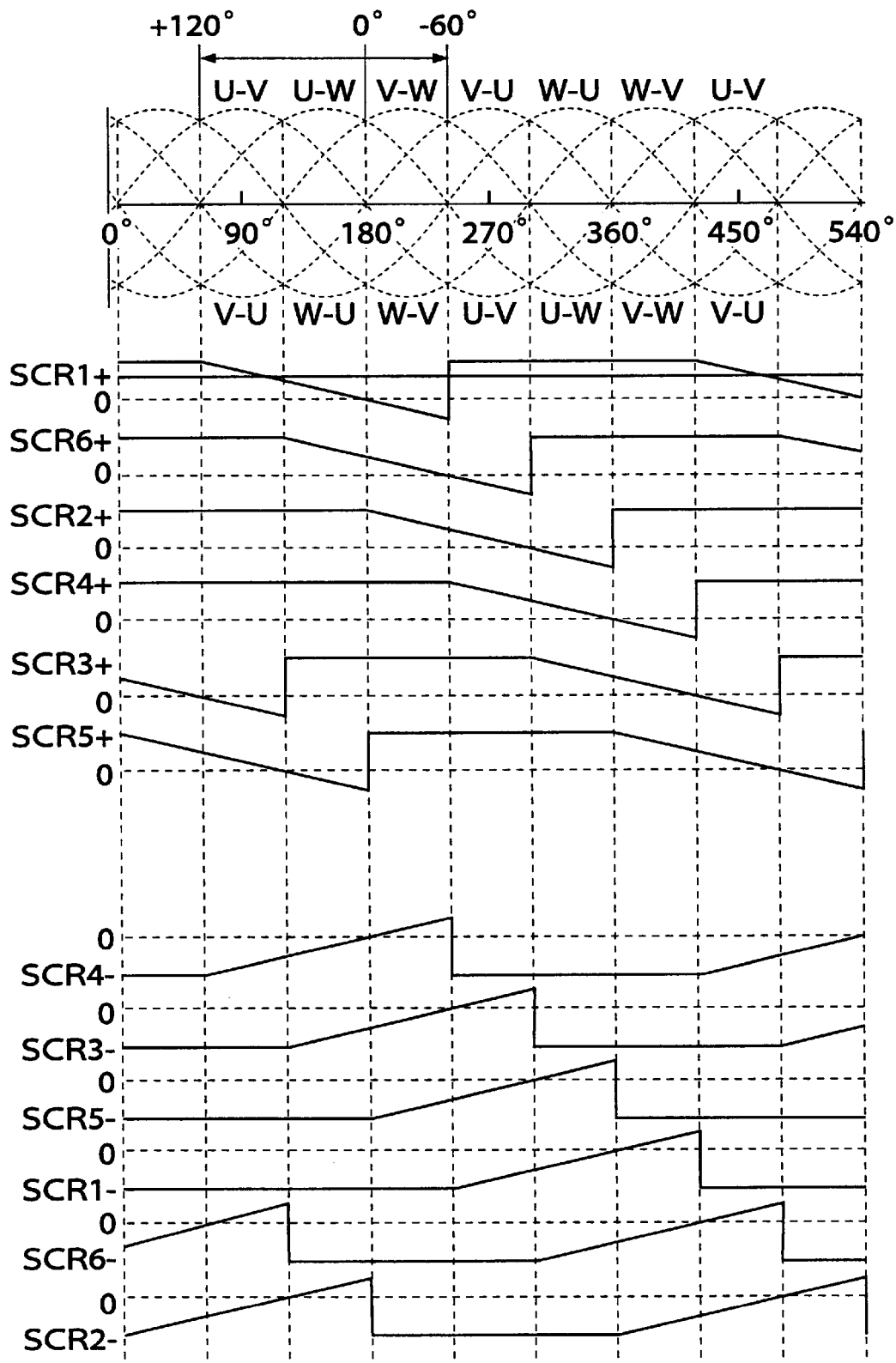
FIG. 9 is a diagram showing reference sawtooth waves generated for controlling the firing angles of the thyristors.

FIG. 9 shows reference sawtooth waves generated for controlling the firing angle α of the thyristors of the cycloconverter. The reference sawtooth waves shown in the figure are generated based on respective electric currents detected by i.e. taken out from the secondary photosensors of the photocouplers PCk shown in FIG. 6.

A reference sawtooth wave for control of the thyristor SCR1+ of the positive converter BC1, for instance, is one which changes in voltage within a phase angle range of 120° to −60° and assumes 0 V at a phase angle of 0°. Reference sawtooth waves each having a phase difference of 600 from adjacent ones sequentially correspond to the thyristors SCRk+, i.e. SCR1+, SCR6+, SCR2+, SCR4+, SCR3+, and SCR5+, respectively.

On the other hand, a reference sawtooth wave for control of the thyristor SCR1− of the negative converter BC2, for instance, is one which is symmetrical with the sawtooth wave for the thyristor SCR1+ with respect to a horizontal zero voltage line, i.e. which has a phase difference of 180° from the sawtooth wave for the thyristor SCR1+. Similarly to the positive converter BC1, reference sawtooth waves each having a phase difference of 60° from adjacent ones sequentially correspond to the thyristors SCRk−, i.e. SCR1−, SCR6−, SCR2−, SCR4−, SCR3−, and SCR5−, respectively.

Thus, the twelve sawtooth waves provide respective reference waveforms for control of the thyristors SCRk± of the positive and negative converters BC1, BC2. These sawtooth waves are compared with a desired waveform r by the use of comparators, not shown, provided in twelve channels, and a point of intersection of each sawtooth wave with the desired waveform determines a firing angle of each corresponding thyristor SCRk±.

By employing a sinusoidal wave as the desired wave to thereby sinusoidally varying the firing angle α, it is possible to obtain a sinusoidal output wave from the cycloconverter CC.

In FIG. 9, the controllable range of the firing angle is expanded from the range of 120° to 0° shown in FIG. 7 to a range of 120° to −60°. The reason for thus expanding the controllable range of the firing angle is as follows:

In the conventional cycloconverter CC in which the firing angle is controlled within a range of 120° to 0°, if the output voltage the cycloconverter CC is controlled to decrease when a capacitive load is connected to an output terminal thereof and at the same time a positive potential exists on the load side, there occurs a discontinuity in the relationship between the firing angle of each thyristor SCRk± and the output voltage, which can make it impossible to stabilize the output voltage. That is, to decrease the output voltage when a positive potential exists on the load side, it is required to absorb the positive charge on the load side. In the conventional cycloconverter, however, the firing angle α is controlled within the limited range of 120° to 0°, impossible for the positive converter BC1 to absorb the positive charge on the load side, and therefore the negative converter BC2 has to absorb it. When the negative converter BC2 absorbs the positive charge, since the output voltage from the negative converter BC2 can change from the negative full-wave rectified voltage to 0 V as described above, the positive charge on the load side suddenly drops to 0 V, causing a discontinuity in the output voltage. If the controllable range of the firing angle is expanded to 120° to −60°, it is possible to absorb the positive charge by the negative converter BC2 such that a positive output voltage is achieved, so that no discontinuity occurs in the output voltage, thereby making it possible to secure stability of the control.

Figure 10:
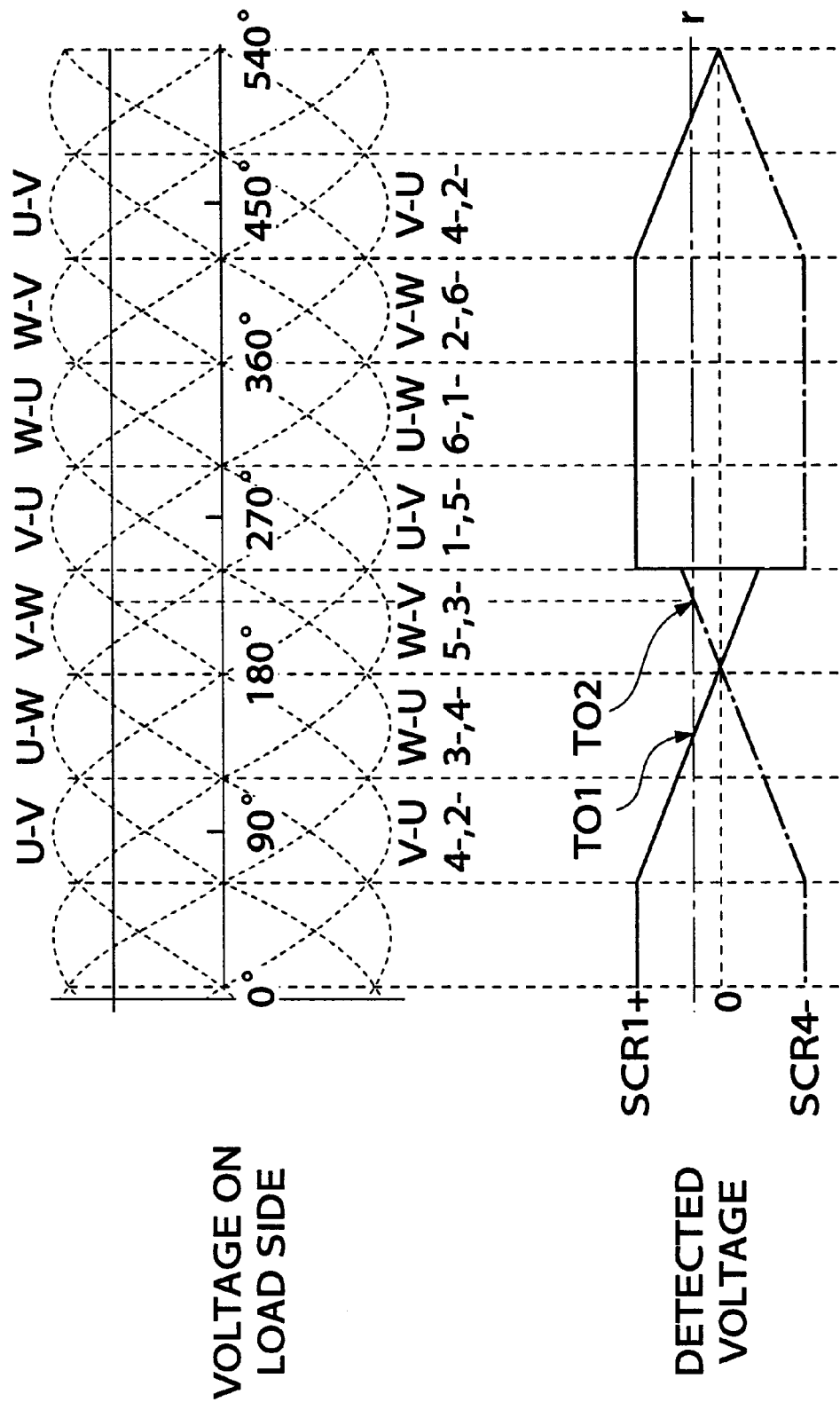
FIG. 10 is a diagram which is useful in explaining a problem to be solved when the firing angle is controlled to a range of 120° to −60°.

However, if the controllable range is thus expanded to the negative side, as shown in FIG. 10, the output ranges of the positive and negative converters BC1, BC2 overlap with each other, so that there exist two intersecting points TO1 and TO2 between the desired wave r and each sawtooth wave, and hence it is impossible to judge which of the positive and negative converters BC1 and BC2 should be selected for firing the gate of a corresponding one of the thyristors SCRk± thereof. To solve this problem, in the present embodiment, one of the positive and negative converters BC1 and BC2 is selected according to results of the comparison by the comparator 16, as described above.

Referring again to FIG. 1, the output side of the synchronizing signal-forming circuit 18 is connected to the positive gate control device 15a and the negative gate control device 15b. Connection lines between the synchronizing signal-forming circuit 18 and the positive and negative gate control devices 15a, 15b are each formed by six signal lines which are connected to respective corresponding ones of the six comparators of each of the gate control devices 15a and 15b for supplying them with the respective sawtooth waves having extended sawtooth portions described above with reference to FIG. 9 at timing shown in FIG. 9.

The output sides of the six comparators of the positive control device 15a are connected to the gates of respective corresponding ones of the thyristors SCRk+ of the positive converter BC1, while the output sides of the six comparators of the negative control device 15b are connected to the gates of respective corresponding ones of the thyristors SCRk− of the negative converter BC2.

Although in the present embodiment, the synchronizing signal-forming circuit 18 is constructed such that it forms synchronizing signals (reference sawtooth waves) in response to the three-phase output from the three-phase sub coil 2, this is not limitative, but a single-phase sub coil may be employed in place of the three-phase sub coil 2 to form a synchronizing signal in response to the single-phase output.

Next, the operation of the power unit constructed as above will be described.

As the rotor R is driven for rotation by the engine, voltages are produced between the three-phase output terminals of the three-phase main coil 1 as described above. Then, as the gate of each of the thyristors SCRk± is fired by the firing angle control device 15, the cycloconverter CC delivers electric current, and the filter 3 removes harmonic components from the electric current. The output voltage-detecting circuit 5 detects the voltage of the electric current. The approximate effective value-calculating circuit 8 calculates the approximate effective value of the voltage based on the voltage thus detected and generates a signal indicative of the calculated approximate effective value.

The comparator 9 compares the approximate effective value with the reference voltage value delivered from the reference voltage-generating circuit 10, and the control function-calculating circuit 11 calculates the control function (linear function) based on results of the comparison to deliver the calculated function. More specifically, the control function-calculating circuit 11 calculates the linear function such that a proportional coefficient (constant of proportionality) of the linear function is increased as the difference between the reference voltage value from the reference voltage-generating circuit 10 and the approximate effective value from the approximate effective value-calculating circuit 8 is larger.

The amplitude control circuit 12 generates a control signal for controlling the amplitude of the sinusoidal wave of 50 Hz or 60 Hz delivered from the sinusoidal oscillator 13, based on the control function thus calculated, and the desired wave-forming circuit 14 forms the desired wave based on the control signal and outputs the same.

The power factor-detecting circuit 19 performs a comparison between the detected wave delivered from the output voltage-detecting circuit 5, which is indicative of voltage detected of the single-phase AC output, and the desired wave delivered from the desired wave-forming circuit 14, to generate a signal indicative of the power factor. Then, the approximate effective value of the output voltage calculated by the approximate effective value-calculating circuit 8 is adjusted based on the generated signal. For example, when the power unit is under a low power factor load condition, the approximate effective value is adjusted to a lower value to lower the output voltage.

Predetermined upper and lower limit values are provided for the output or control signal from the desired wave-forming circuit 14, and the desired wave-forming circuit 14 is constructed such that it cannot generate a voltage value higher than the upper limit value or lower than the lower limit value. That is, as the output value from the comparator 9 increases so that the proportional coefficient of the linear function from the control function-calculating circuit 11 increases, the shape of the desired wave from the desired wave-forming circuit 14 is changed from a sinusoidal one to a rectangular one.

The comparator 16 compares the desired wave from the desired wave-forming circuit 14 with the detected wave from the output voltage-detecting circuit 5. When the former is higher in voltage than the latter, a high level (H) signal is delivered from the comparator 16 to enable the positive gate control device 15a, whereas when the former is lower in voltage than the latter, a low level (L) signal is delivered from the comparator 16 to enable the negative gate control device 15b.

The comparators of a selected one of the positive gate control device 15a and the negative gate control device 15b each compare the desired wave from the desired wave-forming circuit 14 with a corresponding sawtooth wave from the synchronizing signal-forming circuit 18, and when the desired wave agrees with or intersects the sawtooth wave, a one-shot pulse having a predetermined wavelength is delivered from the gate control device 15 to the gate of a corresponding one of the thyristors SCRk± to control the firing angle thereof.

Figure 11A:
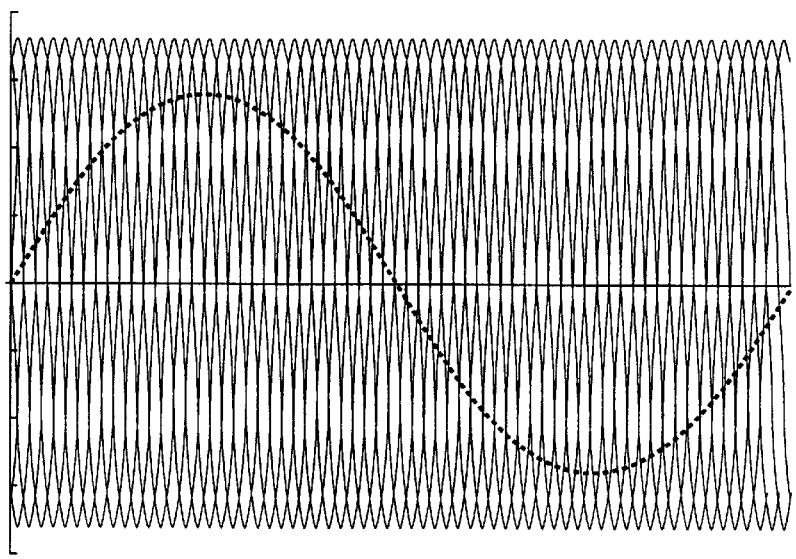
FIGS. 11A to 11C are diagrams showing examples of waveforms of 50 Hz outputs delivered from the FIG. 1 power unit under respective different load conditions.
Figure 11B:
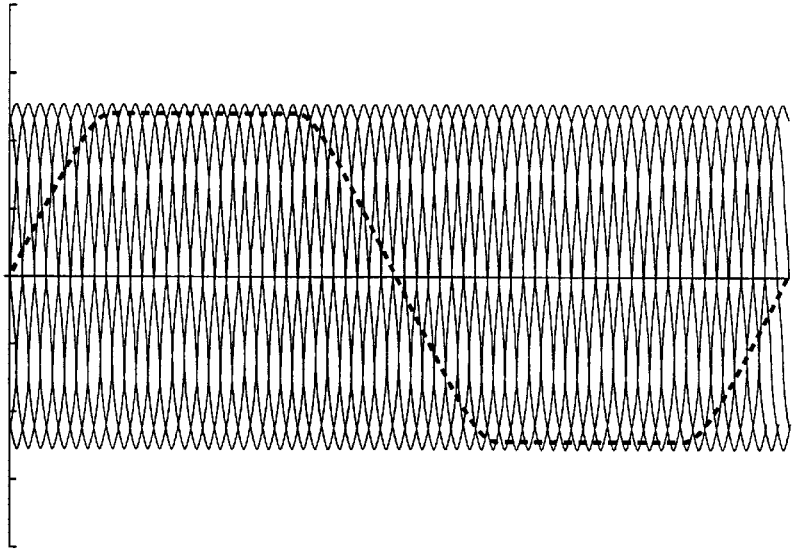
Figure 11C:
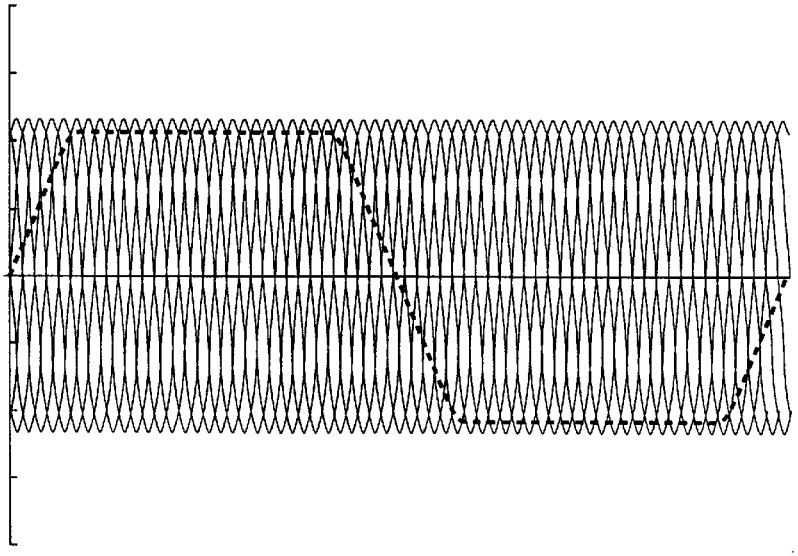

FIGS. 11A to 11C show examples of output waveforms of 50 Hz generated by the power unit of the present embodiment. FIG. 11A shows an output waveform generated when the power unit is under a no-load condition, FIG. 11B an output waveform under a rated load condition, and FIG. 11C an output waveform under an excessive load condition.

As shown in these figures, when an excessive load is applied to the power unit, the output waveform of the cycloconverter is changed from a sinusoidal one to a rectangular one, depending upon the degree of the applied excessive load, i.e. the difference between the reference voltage from the reference voltage-generating circuit 10 and the approximate effective value from the approximate effective value-calculating circuit 8.

Although in the present embodiment, the shape of the desired waveform is changed from a sinusoidal one to a rectangular one according to the load condition, this is not limitative, but when the power unit is constructed such that the output voltage is limited by the maximum amplitude, the amplitude of the desired waveform may be increased according to the load condition.

As describe above, according to the present embodiment, the power factor-detecting circuit 19 generates a signal indicative of the power factor, and the approximate effective value of the output voltage calculated by the approximate effective value-calculating circuit 8 is adjusted based on the generated signal. Particularly, under a low power factor load condition of the power unit, the approximate effective value is adjusted to a lower value to lower the output voltage, which enables the power unit to maintain stability of the operation thereof.

Further, in the present embodiment, the desired wave which is delayed by the fixed time period "x" equivalent to a phase lag occurring in the power unit is set as the desired wave 2, and the power factor is detected in the above described manner to generate a signal indicative of the detected power factor. Therefore, according to the present embodiment, it is possible to detect the power factor regardless of the fixed time period "x" which is equivalent to a phase lag occurring in the power unit, and without any need of detection of the current.

Although in the above described embodiment, the power factor-detecting circuit 19 is formed by hardware, this is not limitative, but the control processing which is executed by the power factor-detecting circuit 19 in the embodiment may be carried out e.g. by the use of a microcomputer and software.

Further, the power factor-detecting method employed in the embodiment is effective not only in a power unit employing a cycloconverter, but also in any other power unit which controls output voltage thereof based on a desired wave and has output voltage-detecting means for detecting the output voltage.

What is claimed is:

1. A portable power unit comprising:
   variable control bridge circuit means;
   desired waveform signal-generating means for generating a desired waveform signal indicative of a desired waveform having a desired frequency;

switching control means for performing switching control of the variable control bridge circuit means, based on said desired waveform signal to cause said variable control bridge circuit means to generate an alternating current output;

output waveform-detecting means for detecting a waveform of said alternating current output to generate an output waveform signal indicative of said detected waveform of the alternating current output;

power factor-detecting means for detecting a power factor by comparing said desired waveform signal and said output waveform signal to generate a power factor signal indicative of the detected power factor; and output voltage control means for controlling voltage of said alternating current output based on said power factor signal.

2. A portable power unit according to claim 1, wherein said power factor-detecting means includes waveform difference signal-generating means for detecting a difference between said desired waveform signal and said output waveform signal to generate a waveform difference signal indicative of said difference, and power factor signal-generating means for reducing said waveform difference signal to zero when said waveform difference signal and said desired waveform signal have opposite signs, and for outputting an absolute value of said waveform difference signal when said waveform difference signal and said desired waveform signal have an identical sign to thereby generate said power factor signal.

3. A portable power unit according to claim 1, including correcting means for correcting said desired waveform signal with respect to a phase lag occurring within said portable power unit to generate a corrected desired waveform signal, and wherein said power factor-detecting means detects said power factor by comparing said corrected desired waveform signal and said output waveform signal.

4. A portable power unit comprising:

a magneto generator having three-phase output windings;

a pair of variable control bridge circuits connected to said three-phase output windings and connected in antiparallel connection to each other to form a cycloconverter for generating a single-phase alternating current to be supplied to a load, said single-phase alternating current having a desired frequency;

a bridge drive circuit responsive to a drive signal, for causing said pair of variable control bridge circuits to be alternately switched to operate every half a repetition period of said single-phase alternating current, to thereby cause said cycloconverter to generate said single-phase alternating current;

desired waveform signal-generating means for generating a desired waveform signal indicative of a desired waveform for controlling said drive signal;

output waveform-detecting means for detecting a waveform of said single-phase alternating current to generate an output waveform signal indicative of the detected waveform of said single-phase alternating current;

power factor-detecting means for detecting a power factor by comparing said desired waveform signal and said output waveform signal to generate a power factor signal indicative of the detected power factor; and output voltage control means for controlling voltage of the single-phase alternating current, based on said power factor signal.

5. A portable power unit according to claim 4, wherein said output voltage control means includes comparison means for comparing said power factor with a predetermined value, and an output voltage control circuit for lowering said voltage of said single-phase alternating current when said power factor is lower than said predetermined value.

6. A portable power unit according to claim 5, wherein said power factor-detecting means includes waveform difference signal-generating means for detecting a difference between said desired waveform signal and said output waveform signal to generate a waveform difference signal indicative of said difference, and power factor signal-generating means for reducing said waveform difference signal to zero when said waveform difference signal and said desired waveform signal have opposite signs, and for outputting an absolute value of said waveform difference signal when said waveform difference signal and said desired waveform signal have an identical sign to thereby generate said power factor signal.

7. A portable power unit according to claim 5, including correcting means for correcting said desired waveform signal with respect to a phase lag occurring within said portable power unit to generate a corrected desired waveform signal, and wherein said power factor-detecting means detects said power factor by comparing said corrected desired waveform signal and said output waveform signal.

8. A portable power unit according to claim 4, including a synchronizing signal-forming circuit for forming a synchronizing signal in synchronism with an output frequency of said magneto generator, and wherein said drive signal is controlled based on both said desired waveform signal and said synchronizing signal.

9. A portable power unit according to claim 5, including an output voltage-detecting circuit for detecting said voltage of said single-phase alternating current, and an output voltage-adjusting circuit for comparing said voltage detected by said output voltage-detecting circuit with a desired voltage to thereby control said bridge drive circuit in a manner such that said voltage of said single-phase alternating current is maintained substantially at a fixed value.

10. A portable power unit according to claim 8, wherein said magneto generator has a magnet rotor, a stator having a plurality of magnet poles, said magnet poles being formed by ones around which said three-phase output windings are wound, and other magnet poles, and signal windings wound around said other magnet poles, said synchronizing signal being taken out from said signal windings wound around said other magnet poles.

11. A portable power unit according to claim 10, wherein said magneto generator is driven by an internal combustion engine having a flywheel, said magnet rotor also serving as said flywheel of said engine.

12. A portable power unit according to claim 2, including correcting means for correcting said desired waveform signal with respect to a phase lag occurring within said portable power unit to generate a corrected desired waveform signal, and wherein said power factor-detecting means detects said power factor by comparing said corrected desired waveform signal and said output waveform signal.

13. A portable power unit according to claim 6, including correcting means for correcting said desired waveform signal with respect to a phase lag occurring within said portable power unit to generate a corrected desired waveform signal, and wherein said power factor-detecting means detects said power factor by comparing said corrected desired waveform signal and said output waveform signal.

14. A portable power unit according to claim 6, including an output voltage-detecting circuit for detecting said voltage of said single-phase alternating current, and an output voltage-adjusting circuit for comparing said voltage detected by said output voltage-detecting circuit with a desired voltage to thereby control said bridge drive circuit in a manner such that said voltage of said single-phase alternating current is maintained substantially at a fixed value.

* * * * *

UNITED STATES PATENT AND TRADEMARK OFFICE
CERTIFICATE OF CORRECTION

PATENT NO. : 5,943,221
DATED : August 24, 1999
INVENTOR(S) : Kouichi ASAI et al.

It is certified that error appears in the above-identified patent and that said Letters Patent is hereby corrected as shown below:

On the title page,
Item [30] Foreign Application Priority Data,
change "Jun. 10, 1997" to --Oct. 6, 1997--.

Signed and Sealed this

Eighteenth Day of July, 2000

Attest:

Q. TODD DICKINSON

*Attesting Officer*    *Director of Patents and Trademarks*